Figure 4:
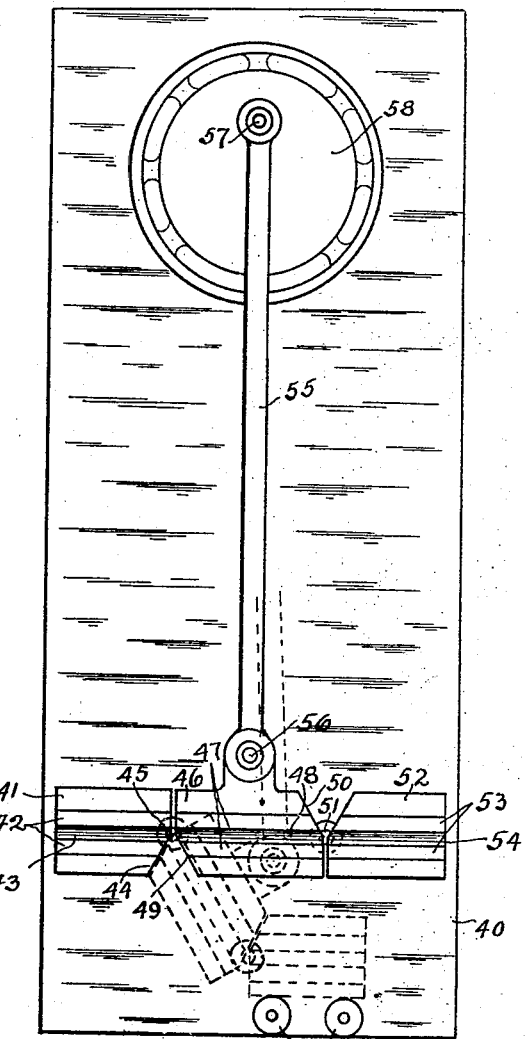

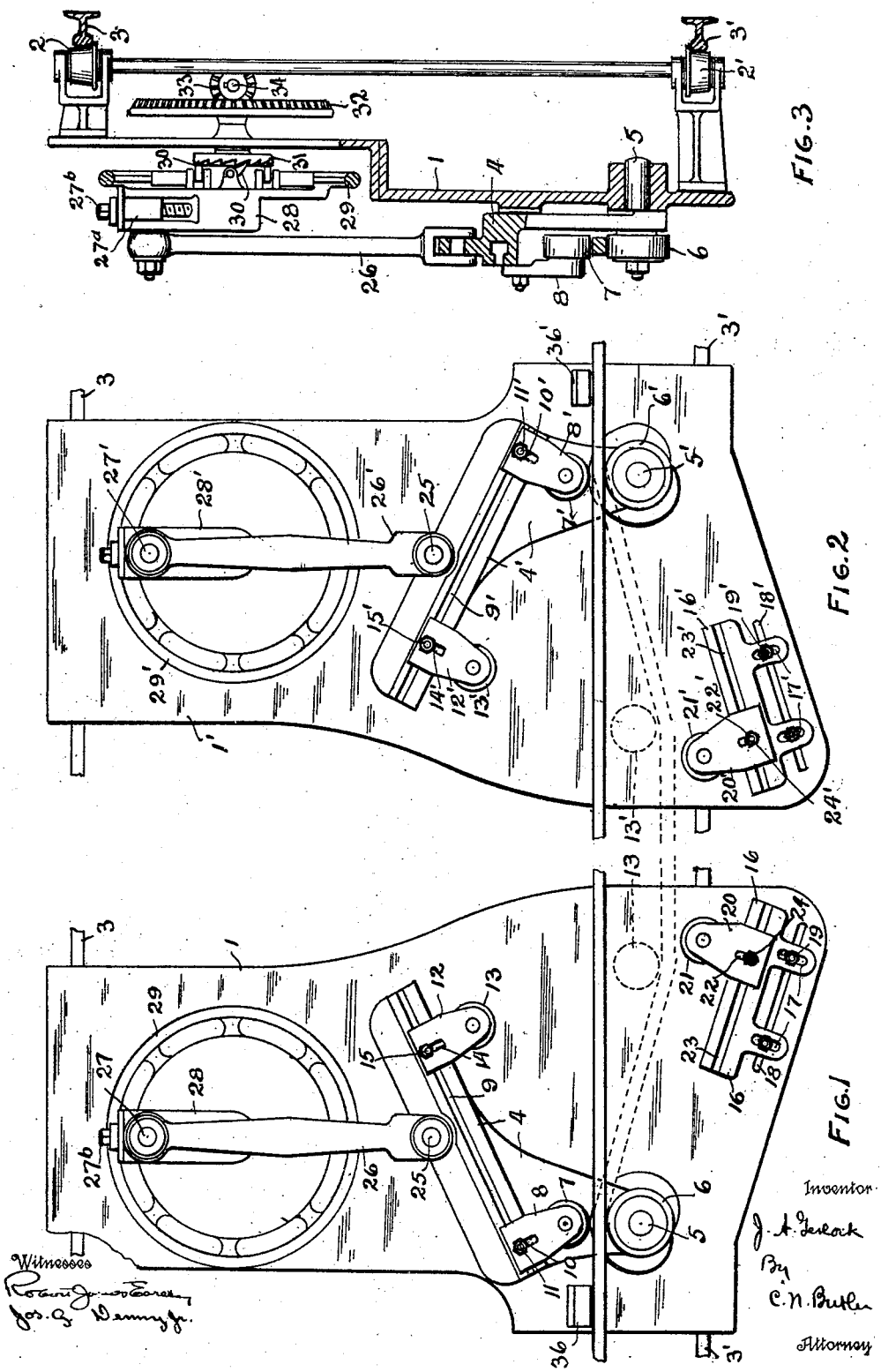

UNITED STATES PATENT OFFICE.

JOHN A. GERLOCK, OF PHILADELPHIA, PENNSYLVANIA, ASSIGNOR TO JOHN NAZEL, OF PHILADELPHIA, PENNSYLVANIA.

BENDING-MACHINE.

No. 910,282.  Specification of Letters Patent.  Patented Jan. 19, 1909.

Application filed June 23, 1908. Serial No. 439,912.

*To all whom it may concern:*

Be it known that I, JOHN A. GERLOCK, a citizen of the United States, residing in the city of Philadelphia, county of Philadelphia, and State of Pennsylvania, have invented certain Improvements in Bending-Machines.

This invention relates to machinery for bending metal bars and it is particularly designed for producing metal shapes used in reinforced concrete.

The characteristic features of the invention will fully appear from the following description and the accompanying drawings in illustration thereof.

In the drawings, Figure 1 is a plan view of mechanism embodying the improvements of my invention; Fig. 2 is a plan view of mechanism similar to that shown in Fig. 1, parts of the two constructions being arranged reversely with relation to each other; Fig. 3 is a vertical sectional view of the machine, and Fig. 4 is a plan view showing a modified construction.

In the preferred construction, shown in Figs. 1 to 3 inclusive, the mechanism comprises the reversely formed beds 1, 1', each carried by wheels 2, 2' which move on the rails 3 so that the beds with the mechanism carried thereby can be varied in position and adjusted with relation to each other.

The beds 1, 1' are provided respectively with the rockers 4, 4' having fulcrums in the pins 5, 5' on which they are adapted to oscillate. Rollers 6, 6' are journaled by means of these pins and adjacent to such rollers are rollers 7, 7', journaled in brackets 8, 8', the brackets being adjustably engaged to the rockers by means of the ways 9, 9' in the rockers, the holes or slots 10, 10' in the brackets, and the bolts 11, 11'. Further brackets 12, 12' carry rollers 13, 13', these brackets being engaged to the rockers by means of the ways 9, 9' in the rockers, the holes or slots 14, 14' in the brackets, and the bolts 15, 15' connecting them. Bearing blocks 16, 16' have slots 17, 17' therein by which they are adjustably engaged to the beds by means of slots 18, 18' therein and the bolts 19, 19'; and fixed to the blocks are the brackets 20, 20' carrying the rollers 21, 21', the brackets being adjustable by means of the holes or slots 22, 22' therein, the ways 23, 23' in the blocks and the connecting bolts 24, 24'.

The rockers are connected respectively, by journaled connections through pins 25, 25', with pitmen rods 26, 26' which are journaled on the crank pins 27, 27' of the crank arms 28, 28', the latter being fixed to wheels 29, 29'. The pins 27, 27' are connected with the respective arms through blocks 27$^a$ adjustable by means of screws 27$^b$, whereby the working length of the arm, the stroke of the pitman and that of the rocker can be varied. The wheels 29, 29' are provided with the dogs 30 which are adapted to engage ratchet wheels 31, the latter being fixed to and revoluble with bevel gears 32. Bevel pinions 33, splined on the revoluble shaft 34, engage and revolve the bevel gears and ratchet wheels so as to revolve the crank arms to oscillate the rockers, the ratchet mechanism permitting each of the crank arms to be moved in the reverse direction, to elevate the rockers, by turning the hand wheels 29, 29'.

A bar 35, which is to be bent, is pushed over the tables, between the respective rollers 6, 7, and 6', 7'. The bar being in position, the revolving shaft 34 acts through the intermediate mechanisms to revolve the cranks 28, 28', and turn down the rockers 4, 4' on their hinges. The rollers 13, 13', carry the intermediate section of the rod to the dotted line position, down to the limiting rollers 21, 21', while the rollers 7, 7' roll the rod over the rollers 4, 4'; hubs 36, 36' on the respective tables acting with the rollers 7, 7' to hold the ends of the rod against lateral movement.

As shown in Fig. 4, there may be used a table 40 on which is fixed an anvil or work holder 41 having the parallel jaws 42 forming a channel 43, the anvil having the beveled face 44. Connected to the table by a hinge 45 is a rocker 46 having the parallel jaws 47 forming a channel 48 adapted to be brought into line with the channel 43, the rocker having the oppositely disposed beveled faces 49 and 50. Connected to the rocker 46 by a hinge 51 is a rocker 52 having the jaws 53 forming a channel 54 adapted to be brought into line with the channels 43 and 48. A pitman 55 is pivotally connected by a pin 56 with the rocker 46 and by a crank pin 57 with the revoluble crank wheel 58 journaled in the table. Rollers 59 carried by the table limit the movement permitted to the rockers 46 and 52 by reason of their hinged connections. With the several channels in alinement a bar to be bent is placed therein and on revolving the crank mechanism the rockers are carried to the dotted line position, correspondingly bending the bar held between the jaws thereof.

It will be understood that instead of bending down the middle of the bar, as illustrated in Figs. 1 and 2, the relation of the duplicate machines there shown may be reversed, so that the ends of the bar shall be bent away from the middle.

Having described my invention, I claim:

1. A bending machine comprising a bed, a rocker adapted to oscillate thereon, crank mechanism having a movable connection with and adapted for oscillating said rocker, and means for holding a section of rod while an adjacent section thereof is subjected to the bending action of said rocker.

2. A bending machine comprising a bed, a rocker adapted to oscillate thereon, roller mechanism carried by said rocker, crank mechanism connected with and adapted to operate said rocker, means for holding a rod during the bending action thereon of said roller mechanism, and means for limiting the bending movement of said rod.

3. A bending machine comprising a bed, a rocker adapted to oscillate thereon, a roller having an axis common to said rocker, a bending roller connected in adjustable relation to said rocker, a limiting roller connected in adjustable relation to said bed, and a hub on said bed, said hub coacting with said roller first named to hold a rod section while an adjacent section thereof is carried by the action of said bending roller into contact with said limiting roller.

4. A bending machine comprising a bed, a rocker having a connection with said bed upon which it is adapted to oscillate, a way in said rocker, a bracket having an adjustable connection with said way, a roller carried by said bracket, a pitman connected with said rocker, a crank connected with said pitman, and means for revolving said crank.

5. A bending machine comprising a bed, a rocker having an axis of oscillation on said bed, a roller revoluble upon said axis, a pair of bending rollers adjustable along said rocker, and crank mechanism for oscillating said rocker.

6. A bending machine comprising a pair of beds each having an oscillating rocker thereon, a crank mechanism having a movable connection with and adapted for operating each of said rockers, a revoluble shaft, and mechanisms whereby said shaft is connected with each of said crank mechanisms.

7. A bending machine comprising a bed, a block connected thereto, a limiting roller adjustably connected to said block, a rocker connected to said block, a roller revoluble about the axis of oscillation of said rocker, one or more bending rollers adjustably connected with said rocker, a pitman connected to said rocker, a crank connected to said pitman, and means for revolving said crank.

8. A bending machine comprising a bed, a revoluble crank, a pitman reciprocated by said crank, means fixed to said bed for holding a rod, and a rocking device connected with said pitman for bending said rod.

In witness whereof I have hereunto set my name this 22nd day of June, A. D. 1908, in the presence of the subscribing witnesses.

JOHN A. GERLOCK.

Witnesses:
ROBERT JAMES EARLEY,
Jos. G. DENNY, Jr.